Jan. 25, 1966
J. G. BARHAM
3,231,189
AGRICULTURAL COMPUTER
Filed Feb. 8, 1965
2 Sheets-Sheet 1
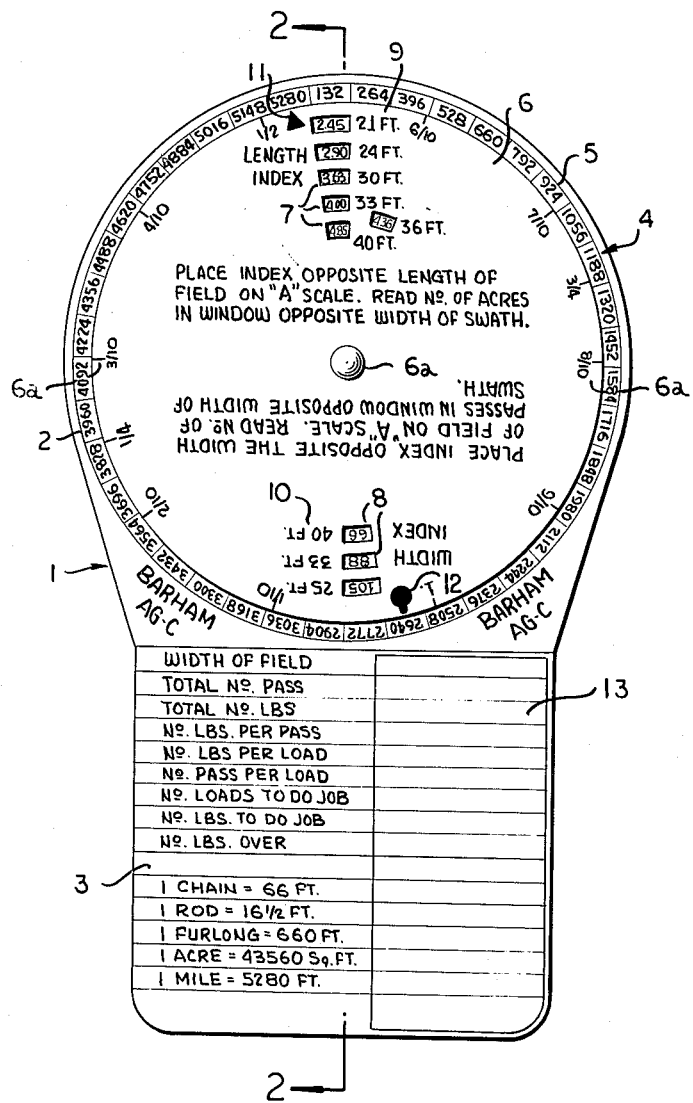
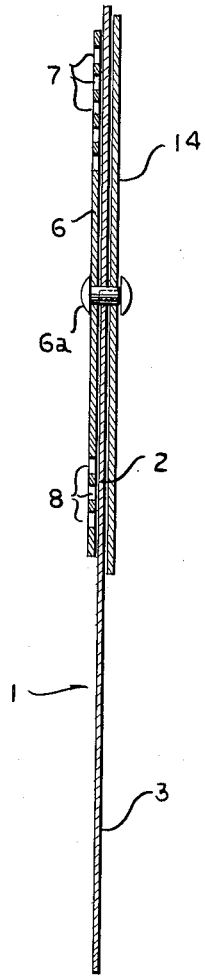
INVENTOR
JAMES G. BARHAM
BY Hurvitz & Rose
ATTORNEY Jan. 25, 1966  J. G. BARHAM  3,231,189
AGRICULTURAL COMPUTER
Filed Feb. 8, 1965  2 Sheets-Sheet 2

INVENTOR
JAMES G. BARHAM

BY *Hurvitz & Rose*

ATTORNEYS 3,231,189
AGRICULTURAL COMPUTER
James Gordon Barham, 2211 Alma St., Alexandria, La.
Filed Feb. 8, 1965, Ser. No. 430,867
3 Claims. (Cl. 235—78)

This invention relates to a combination circular multiplication and division table, circular slide rule and conversion table, and erasable writing surface. More particularly this invention relates to the above combination wherein the multiplication and division table is used for the purpose of determining the number of acres in a field having dimensions given in feet and for determining the number of swaths a material spreading airplane must make across a field of a known width when the width of the strip of spread material is known for each swath.

Agricultural operations often require that fields be measured in length and width in terms of feet and inches and the resulting figures be used to determine the number of acres in the field. Because a square foot of land is a fraction of an acre, a multiplication table can be devised with the length of the field as the multiplier, the width of the field as the multiplicand, and the products listed in terms of acres. (Square feet divided by the number of square feet per acre give the number of acres in a field.) One feature of the present invention is designed specifically to determine the number of acres covered by a machine which traverses a field having a given length and covering a swath of a given width. By knowing the number of acres involved it is possible to calculate the density at which material is spread by the machine which passes over the land. Thus correct and uniform spreading procedures may be insured.

In addition to the above requirement for determining the number of acres in a plot of land and for determining the density of material spread on the plot of land, it is often necessary to know the number of swaths that must be completed to spread material over an entire field having a specified width. Therefore a second feature of the present invention is designed specifically to divide the total width of a field by the width of each swath to determine the total number of swaths that will be necessary to spread material over the entire field. By knowing the consumption of spread material per swath, the number of swaths necessary, and the amount of material for spreading that can be carried by the machine, it is possible to determine how many times it will be necessary to load the machine and how much material should be loaded in the machine for maximum efficiency and safety.

The agricultural calculator of the present invention has the further feature of an integral writing surface which is secured to and extends from the body of the calculator for use in recording measured properties or recording results of calculations. The writing surface is made of a material easily wiped clean with the hand if marked with a suitable marking material.

Also included in the agricultural computer of the present invention are the logarithmic C and D scales of a circular slide rule for use in general computations involving multiplication and division. Adjoining the D scale and in functional fixed relationship to the D scale is a conversion scale for converting sacks of a specific material to pounds of the material. In the specific instance of the preferred embodiment of the present invention eighty pound sacks of seed are of concern with the conversion scale representative of units of sacks of material and the D scale representative of pounds of material.

The circular combination multiplication and division table consists of a circular table having some elements usable for either multiplication or division and some elements usable only for multiplication or division. Numbers which may be used either as multipliers or numerators are disposed circumferentially around the periphery of the table. Because a multiplication or division table is a two dimensional array of numbers with the multipliers or numerators disposed along one coordinate dimension and multiplicands or denominators disposed along the second coordinate dimension, the multiplicands and denominators must be represented along the radial coordinate. There could be a sector of the table devoid of multipliers, numerators, products, and quotients for placement of the multiplicands and denominators. However, if the multiplicands and denominators are represented by holes disposed along one or more radial coordinates in a concentric front disk overlaying the table, the whole table can be filled with multipliers, numerators, products, and quotients. Furthermore, the table is much more readable if only a single row of products is visible through holes in the front disk wherein the products are produced by a single multiplier and multiplicands adjacent the holes, and if only a single row of quotients is visible through holes in the front disk wherein the quotients are produced by a single numerator and the denominators adjacent the holes. Therefore, the multipliers and numerators are circumferentially disposed about the periphery of the circular table and the multiplicands and denominators are represented by holes disposed radially in a front disk concentric with the circular multiplication and division table. The circular multiplication and division table has products and quotients arranged at points that are functions of the points where the radial coordinate on which the multiplier or numerator is located intersects with the circumferential coordinate on which the multiplicand or denominator is located. Radial multiplicands and denominators do not physically appear on the multiplication and division table but are inferred to be present since the table is laid out as if they were present. Radial multiplicands and denominators are present on the front dial that overlays the multiplication and division table.

The calculator as above described is useful for any purpose where a multiplication or division table is useful, but in particular it is useful as an agricultural calculator for determining acres in a field wherein rectangular dimensions are known in feet or for determining the number of swaths of a specific width that must be made to cover a field of a specific width.

It is, therefore, a principal object of the present invention to provide an agricultural computer for quickly and easily determining the number of acres in a field having known rectangular dimensions.

A further object of the present invention is to provide an agricultural computer which has means to determine any problem involving multiplication and division and means attached to the computer for recording results of calculations and factors involved in calculations.

Still another object of the present invention is to provide a circular multiplication and division table from which readings may be easily and accurately taken.

Further objects and advantages of the present invention will be apparent from the following description, reference being had therein to the accompanying drawings wherein preferred embodiments of the invention are shown.

FIGURE 1 is a front view of the agricultural calculator of the present invention showing a circular multiplication and division table covered by a front disk having holes therein for reading products and quotients.

FIGURE 2 is a cross-section of the agricultural calculator taken along section line 2—2 of FIGURE 1.

Figures 3, 4:
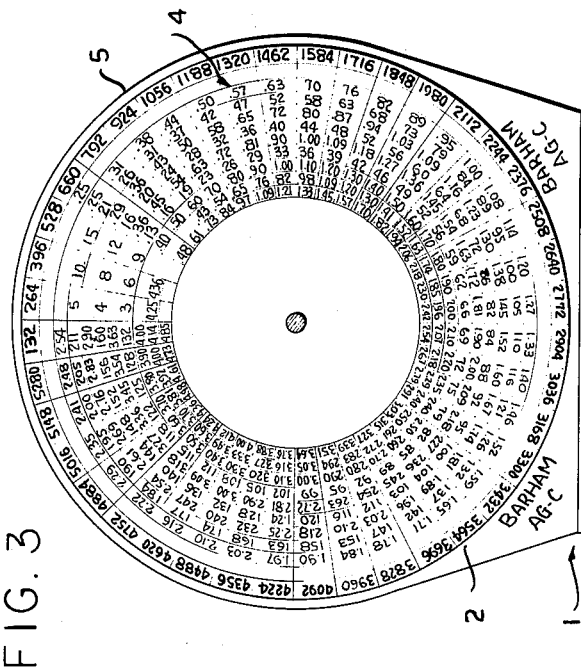
FIGURE 3 is a front view of the base plate of the agricultural calculator of FIGURE 1 showing the circular multiplication and division table.
FIGURE 4 is a back view of the agricultural calculator of FIGURE 1 showing a circular logarithmic slide rule and a conversion table for converting pounds of a material to sacks of the material.

Referring now to the drawings, FIGURE 1 shows a base plate 1 made in the form of a flat disk 2 with an arm sector 3 integral with the flat disk and extending to one side of the flat disk. The front side of the flat disk portion 2 of the base plate 1 has a circular multiplication and division table 4 printed thereon. Multipliers and numerators 5 are arranged circumferentially around the outer periphery of the flat disk 2. Overlying the flat disk 2 is a front disk 6 rotatably secured at its center by means of a fastener 6a to the center of the flat disk 2. Although a space could be provided on the multiplication and division table 4 to radially position multiplicands and denominators on table 4, for easier and more accurate use of the table 4 the multiplicands and denominators are positioned radially on the front disk 6 adjacent windows 7 and 8 for viewing products and quotients respectively. Products and quotients are interleaved on the multiplication and division table 4 so that the windows 7 and 8 may be set in a radial line and yet have support material between the windows. Adjacent windows 7 there are radially positioned multiplicands 9, and adjacent windows 8 there are radially positioned denominators 10. Triangular index marker 11 is positioned on the front disk 6 so that when it is placed opposite a multiplier 5 the selected multiplier times a multiplicand 9 will produce a product or a product times a constant in a window 7 adjacent a selected multiplicand 9. Circular index marker 12 is positioned on the front disk 6 so that it may be placed opposite a numerator 5 in such a manner that the selected multiplier 5 times a denominator 10 will produce a quotient in a window 8 adjacent a selected denominator 10. Arm section 3 is provided ruled lines and printed notation for a particular application of the computer. A portion of the arm section 3 is covered by a sheet of plastic 13 which may be written on with a suitable marking device such as a wax pencil and erased simply by rubbing the plastic with a finger.

The general use of the computer is as follows: Where it is wished to multiply two numbers together the triangular index marker 11 is positioned opposite the desired multiplier 5, the desired multiplicand 9 is selected and the product is read from the window 7 adjacent the multiplicand 9 of interest. As illustrated in the drawing, the products have all been multiplied by a constant conversion factor, however, if such were not done the number adjacent the multiplicand of interest would be the actual product of the multipler and multiplicand.

Where it is desired to divide a first number by a second number the circular index marker 12 is set opposite the desired numerator 5 and the quotient is read from the window 8 adjacent the denominator 10 of interest.

The numbers 5 which may represent either multipliers or numerators are located on a circumferential coordinate while the multiplicands 9 and the denominators 10 are located on radial coordinates. Products and quotients appear at the intersection of the radial coordinate of the multiplier or numerator in question and the circumferential coordinate of the multiplicand or denominator in question.

Provision for conversion of feet into miles is made by calibrating the periphery of the front disk 6 with indicia 6a representing fractions of a mile which correspond to multiplier and numerator indicia 5 representing fractions of a mile in feet when index marker 12 is set to a specific indicia 5, such as "132." To convert tenths and quarters of a mile to feet, place index marker 12 opposite "132" on scale having indicia 5. Indicia 6a representing fractions of a mile will be opposite corresponding values for a fraction of a mile given in feet on the scale having indicia 5.

The agricultural computer of the present invention is meant for use as an aid to agriculturalists in operations involving spreading of materials such as seeds on fields. If it is desired to use the computer to determine the number of acres covered in one swath by a machine traveling the length of a field, the length of the field in feet may be used as a multiplier 5 and the width of the swath in feet may be used as the multiplicand 9. Triangular index marker 11 is placed opposite the multiplier of interest and the product appearing in a window 7 adjacent the multiplicand of interest will provide the answer in acres if the product has been converted from square feet to acres. Should it be desired to determine the number of swaths of a certain width which will be necessary to cover a field, the numerators 5 can represent the total width of the field and the denominators 10 can represent the width of an individual swath. By placing the circular index marking 12 opposite the numerator 5 representing the total width of the field the number of swaths of a specific width necessary to cover the field can be read in a window 8 adjacent a denominator 10 representative of the width of the swath of interest.

FIGURE 2 is a cross-section of the calculator taken along section line 2—2 of FIGURE 1. Base plate 1 including flat disk 2 and arm section 3 forms a base for support of front disk 6 and back disk 14 by means of a fastener 6a. Back disk 14 forms the movable C scale of a standard logarithmic circular slide rule.

FIGURE 3 shows the front side of the base plate 1 with the products and quotients of the circular multiplication and division table arranged circumferentially and radially on the flat disk 2. Extending from flat disk 2 is an arm section 3 having a plastic surface 13 for recording factors used in making calculations and for recording the results of calculations. The numbers 5 circumferentially arranged around the periphery of the flat disk 2 may represent either multipliers or denominators. No multiplicands or denominators actually appear on the multiplication and division table, but they are inferred to be disposed radially. Multiplicands and denominators appear on the front disk 6 which overlays the multiplication and division table. Products and quotients appear at the intersection of the radial coordinate of the multiplier or numerator in question and the circumferential coordinate of the multiplicand or denominator in question.

FIGURE 4 shows the back of the base plate 1 of the calculator of the present invention. The back side of the flat disk 2 has printed thereon the D scale 15 of an ordinary circular slide rule. Between the D scale 15 and the periphery of the flat disk 2 is a conversion scale 16 used in converting pounds of a specific material into sacks of the same specific material. Rotatably secured at its center to the center of the flat disk 2 is a back disk 14 bearing the C scale of an ordinary circular slide rule. Conversion scale is disposed around the periphery of the D scale 15. The conversion scale 16 is a logarithmic scale so as to have a linear relationship with the logarithmic D scale 15. The conversion scale 16 is a constant times the D scale 15 so that pounds of a material on the D scale 15 will be converted to sacks of the same material on the conversion scale 16. The arm section 3 on the back side of the base plate 1 has a plastic surface for rotation which is easily erased by being rubbed with finger.

Operation of the circular slide rule of the present invention is the same as any conventional slide rule. The D scale 15 and the conversion scale 16 may be used to convert pounds of seed or any other material to sack units of the same material. Pounds on the D scale in the example of the drawing are converted to units of 80 pound sacks on the conversion scale 16.

The agricultural calculator as above described finds greater utility in the seeding of forests from an airplane or spraying from an airplane. Since the acre is the unit of land most common in specifications dealing with agricultural materials, it is desirable to be able to calculate easily and swiftly the number of acres in a field of known dimensions. For reasons of economy and safety it is desirable to know the number of swaths of a particular width that will be required to spread material over a field of a given width. Loads can be proportioned to give minimum weight per load and a minimum number of flights if the total number of swaths is known.

While I have shown and described but one form of the apparatus it will be apparent that it is capable of many modifications. Changes, therefore, in construction and arrangement may be made without departing from the spirit and scope of the invention as defined by the appended claims.

I claim:

1. An agricultural computer for use in computations relating to the spreading of material over a field of known dimensions; said computer comprising a base plate including a substantially circular portion, and a co-planar portion projecting from said substantially circular portion for recording and subsequent erasure of the results of said computations; a numerical scale disposed circumferentially along one surface of said substantially circular portion adjacent the periphery thereof; said scale having indicia designating length of field in units of distance in uniform increments therealong; an opaque disk rotatably mounted on said substantially circular portion parallel and adjacent to said one surface thereof and concentric therewith; said disk having a diameter smaller than the diameter of said substantially circular portion to expose said scale; a plurality of further scales circularly disposed in concentric relation at radial intervals along said one surface of said substantially circular portion; said further scales having indicia graduated respectively in units of area and in number of strips of predetermined width for a predetermined field length, at alternate ones of said radial intervals; a first plurality of radially aligned windows in said disk, each having a designation indicative of a graduated unit of strip width; a first index mark adjacent the periphery of said disk and disposed relative to said first plurality of windows such that alignment of said index mark with any one of said indicia of said first mentioned numerical scale exposes indicia designating units of area, at said first plurality of windows, corresponding to respective strip widths for the selected field length adjacent said index mark; a second plurality of radially aligned windows in said disk, each having a designation indicative of a graduated unit of strip width; each of said second plurality of windows being radially offset from each of said first plurality of windows by one of said radial intervals; a second index mark adjacent the periphery of said disk and disposed relative to said second plurality of windows such that alignment of said second index mark with any one of said indicia of said first-mentioned numerical scale exposes indicia representing number of strips of the respectively designated strip width, at said second plurality of windows, for the selected field length adjacent said second index mark.

2. The combination according to claim 1 wherein is further included a conversion scale circumferentially disposed adjacent the periphery of said disk and having indicia designating distance in units different from that of said first mentioned numerical scale for appropriate conversion of units, as desired, by alignment of indicia of said conversion scale with indicia of said first-mentioned numerical scale.

3. The combination according to claim 2 wherein is included a logarithmic scale circumferentially disposed adjacent the periphery of said substantially circular portion on the surface thereof opposite said one surface; a second disk rotatably mounted on said substantially circular portion parallel and adjacent to said opposite surface thereof and concentric therewith; said second disk having a diameter smaller than the diameter of said substantially circular portion to expose said logarithmic scale; a further logarithmic scale identical to said first-mentioned logarithmic scale and circumferentially disposed adjacent the periphery of said second disk; said first-mentioned and further logarithmic scales having respective indicia representing units of area of field and units of quantity of material desired; and a conversion scale circularly disposed on one of said opposite surface of said substantially circular portion and said second disk, having indicia graduated in units of commercially packaged quantities of said material; whereby quantity of material in terms of area and loads per trip during spreading may be computed.

References Cited by the Examiner

UNITED STATES PATENTS

| 331,264 | 11/1885 | Tucker | 235—88 |
| 784,660 | 3/1905 | Chritton | 235—88 |
| 804,646 | 11/1905 | Young | 235—88 |
| 1,161,381 | 11/1915 | Duffy | 235—88 |
| 1,418,947 | 6/1922 | Lysen | 235—84 |
| 2,423,822 | 7/1947 | Auerbach | 235—78 |
| 2,517,793 | 8/1950 | Lancaster | 235—88 |
| 2,901,167 | 8/1959 | Mudge | 235—88 X |
| 3,084,858 | 4/1963 | Clapp | 235—84 |

FOREIGN PATENTS

| 15,143 | 1912 | Great Britain. |
| 555,811 | 3/1957 | Belgium. |
| 170,134 | 9/1935 | Switzerland. |

LEO SMILOW, *Primary Examiner.*

C. G. COVELL, *Assistant Examiner.*